Patented Nov. 1, 1932

1,885,475

UNITED STATES PATENT OFFICE

HANS PERSIEL, OF HORNAU IN TAUNUS, AND GERHARD BALLE AND KURT SPONSEL, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ARTIFICIAL PRODUCTS FROM CELLULOSE DERIVATIVES AND PROCESS OF PREPARING THE SAME

No Drawing. Application filed February 7, 1928, Serial No. 252,672, and in Germany February 12, 1927.

The present invention relates to artificial products from cellulose derivatives and process of preparing the same.

We have found that elastic masses, films, foils, threads, impregnating agents, agglutinants, sizings, dressings, coatings of every kind or the like can be prepared by desiccating emulsions which consist on the one hand of solutions in organic solvents of cellulose derivatives which are insoluble in water and on the other hand of solutions in water of cellulose derivatives which are insoluble in organic media or capable of very slightly swelling therein, the materials thus obtained being entirely insoluble both in water and in organic solvents.

Among the water-soluble cellulose derivatives we preferably use in our process cellulose ethers, for instance methyl cellulose, ethyl cellulose and oxalkyl cellulose and we have found the most suitable for our purposes to be for instance methyl cellulose the methylation degree of which varies between 1.5 and 2.5 mols of methoxyl per one mol of $C_6H_{10}O_5$, and which are of low or medium viscosity. As regards ethyl celluloses, they can be used with the same result as methyl celluloses particularly if precaution is taken that their degree of ethylation does not exceed 1.5 mols of ethoxyl per one mol of $C_6H_{10}O_5$, whereas the celluloses which are ethylated to a higher degree are inconvenient on account of their insolubility in water. Oxalkyl celluloses which can be produced in a water-soluble form in known manner by the action of an alkylene oxide upon cellulose or by the action of an alkylene chlorohydrine upon sodium cellulose, are also suitable for the method in question.

In our new process there may be used with great advantage as water-insoluble cellulose compounds inorganic esters of cellulose such as nitro celluloses, also acetyl celluloses and all other esters of celluloses obtainable from an organic acid, moreover all water-insoluble cellulose ethers such as ethyl cellulose containing more than 1.5 mols of ethoxyl per one mol of $C_6H_{10}O_5$, benzyl celluloses and the oxalkyl ethers of cellulose obtainable in a water-insoluble form by one of the usual methods. The said water-insoluble cellulose compounds must, however, necessarily be soluble in organic solvents, preferably in such low-boiling or high-boiling solvents as are only slightly miscible with water.

For instance, in order to prepare an insoluble cellulose pellicle there may be used as one of the components an aqueous solution of methyl cellulose of the above mentioned kind, and as the other component, for instance a nitro cellulose solution in a high-boiling organic solvent. The solvents should preferably be so selected that the emulsions produced by mixing the two solutions remain stable while drying up. The desiccation or evaporation of the solvents may be effected at the ordinary or at an elevated temperature, with or without applying a vacuum, and the solvents may also be removed by precipitating-baths. The new bodies are insoluble not only in water but also in organic solvents.

There may be incorporated into the component dissolved in an organic solvent, or into that dissolved in water, or into both, before mixing them, any further substances, such as plasticizers, softening agents, pigments, dyes, agglutinants, odoriferants or filling materials like kieselguhr, wood-shavings, sawdust, or waste from textile materials either dissolved or finely divided, spread or dispersed or in a mere suspension; such admixtures may still easily be added to the finished emulsions in order to modify the properties of the final product, for instance its transparency, gloss, color, odor, hardness, elasticity and so on.

The following examples serve to illustrate our invention but they are not intended to limit it thereto, the parts stated therein being by weight.

(1.) 50 parts of a 5 per cent aqueous methyl cellulose solution are introduced, while stirring, into 20 parts of a nitro cellulose solution consisting of 14 parts of nitro cellulose soaked with butanol and containing 65 per cent of dry wool, 100 parts of acetyl-glycolic acid ethyl ester, 10 parts of benzyl alcohol, 50 parts of acetyl acetate and 42 parts of methyl acetate. Thus, a thickly liquid, whitish emulsion is obtained, which is very stable. When desiccated in thin or moderately thick layers, it yields a transparent film which is insoluble in water and organic solvents and is remarkable for its extraordinary toughness and resistance to the action of cold.

(2.) 7 parts of a 6 per-cent colluloid solution, prepared from 6 parts of celluloid waste, 12 parts of acetyl-glycolic acid ethyl ester, 18 parts of butyl acetate, 45 parts of butanol, 10 parts of xylene and 8 parts of light benzene, (white spirit) are emulsified together with 8 parts of a 5 per cent aqueous solution of methyl cellulose and this emulsion, if desired, after addition of a coloring matter, a pigment, a filling material or the like, is applied to card-boards. The coating thus prepared protects the paper from wetness and moisture; it can easily be cleaned by washing with water or soap and may also be provided with impressions, engravings or embossings. Besides, the articles made of the material thus prepared are of great durability. The above mentioned admixtures may also be added before emulsifying to both constituent solutions or, if desired, partly to either of them.

(3.) 50 parts of a 5 per cent solution of nitro cellulose prepared from 5 parts of collodion wool, 30 parts of butyl acetate, 40 parts of butanol and 25 parts of a diluent for instance benzene, are mixed with 50 parts of a 5 per cent aqueous solution of methyl cellulose of the above specified kind, whereby an extremely stable emulsion is produced. This emulsion is then, if desired, mixed and triturated in the usual manner with a pigment or other coloring matter, a filling material, or any other admixture and then applied on paper or a fabric by means of rollers or printing blocks. The coating thus produced is, after drying, water-resisting and is even not attacked by any organic solvent.

(4.) 30 parts of an 8 per cent solution of acetyl cellulose prepared from 8 parts of acetyl cellulose, 10 parts of benzyl alcohol, 40 parts of acetyl-glycolic acid ethyl ester, 10 parts of cyclohexanone and 32 parts of methyl acetate are emulsified together with 50 parts of a 5 per cent aqueous solution of a water-soluble ethyl cellulose. This emulsion, when dry, yields a flexible tough film which is non-inflammable and is not attacked by water or organic solvents. Combined with a suitable pigment, the said emulsion yields a mass which is suitable for the painting of paper, card-board, textile fabrics or the like.

(5.) 30 parts of a solution of benzyl cellulose, consisting of 10 parts of benzyl cellulose, 10 parts of benzyl alcohol, 10 parts of acetyl-glycolic acid ethyl ester, 10 parts of butanol, 10 parts of xylene and 50 parts of solvent naphtha are emulsified together with 50 parts of a 6 per cent aqueous solution of oxethyl cellulose. Fabrics soaked with the emulsion thus obtained, become water-resisting after being dried at 40° C. By repeatedly applying the emulsion on the fabrics the pores and interstices of their texture become completely closed and thus a dense and skin-like tissue of horn-like durability is obtained which may be worked up into drum-skins or the like.

In the following claims the term "cellulose derivatives" is to be understood to comprise cellulose esters, such as for instance nitro cellulose and acetyl cellulose and also cellulose ethers, such as for instance methy, ethyl, oxethyl, phenyl and benzyl cellulose.

We claim:

1. The process which comprises dissolving in an organic solvent a cellulose derivative which is substantially insoluble in water and does not swell therein, mixing said solution with another cellulose derivative dissolved in water, and desiccating the emulsion thus obtained.

2. The process which comprises dissolving in an organic solvent a cellulose ester which is substantially insoluble in water and does not swell therein, mixing said solution with a cellulose ether dissolved in water, and desiccating the emulsion thus obtained.

3. The process which comprises dissolving in an organic solvent a cellulose ester which is substantially insoluble in water and does not swell therein, mixing said solution with methyl cellulose dissolved in water, and desiccating the emulsion thus obtained.

4. The process which comprises dissolving in an organic solvent nitro cellulose which is substantially insoluble in water and does not swell therein, mixing said solution with a cellulose ether dissolved in water, and desiccating the emulsion thus obtained.

5. The process which comprises dissolving in an organic solvent nitro cellulose which is substantially insoluble in water and does not swell therein, mixing said solution with methyl cellulose dissolved in water, and desiccating the emulsion thus obtained.

6. The process which comprises dissolving in an organic solvent a cellulose derivative which is substantially insoluble in water and does not swell therein, mixing said solution with another cellulose derivative dissolved in water, the organic solvents being only slightly miscible with water and being used in such a quantity and in such proportion that the stability of the emulsions is maintained during the subsequent desiccation, and finally desiccating the emulsion thus obtained.

7. As a new product a mass which is substantially insoluble in water and in organic solvents, possesses a high degree of mechanical solidity and is obtainable by desiccating an emulsion prepared by mixing a solution of a cellulose derivative which is substantially insoluble in water and does not swell therein, but is soluble in organic solvents with an aqueous solution of another cellulose derivative which is capable of dissolving in water.

8. As a new product a mass which is substantially insoluble in water and in organic solvents, possesses a high degree of mechanical solidity and is obtainable by desiccating an emulsion prepared by mixing a solution of a cellulose derivative which is substantially insoluble in water and does not swell therein, but is soluble in organic solvents with an aqueous solution of a water-soluble cellulose ether.

9. As a new product a mass which is substantially insoluble in water and in organic solvents, possesses a high degree of mechanical solidity and is obtainable by desiccating an emulsion prepared by mixing a solution of nitrocellulose which is substantially insoluble in water and does not swell therein but is soluble in organic solvents with an aqueous solution of water-soluble methyl cellulose.

In testimony whereof, we affix our signatures.

HANS PERSIEL.
GERHARD BALLE.
KURT SPONSEL.